(No Model.) 3 Sheets—Sheet 1.

F. D. DARRAGH, C. W. BETTS & J. A. KILTON.
ORE CONCENTRATOR.

No. 544,290. Patented Aug. 13, 1895.

(No Model.) 3 Sheets—Sheet 2.
F. D. DARRAGH, C. W. BETTS & J. A. KILTON.
ORE CONCENTRATOR.
No. 544,290. Patented Aug. 13, 1895.
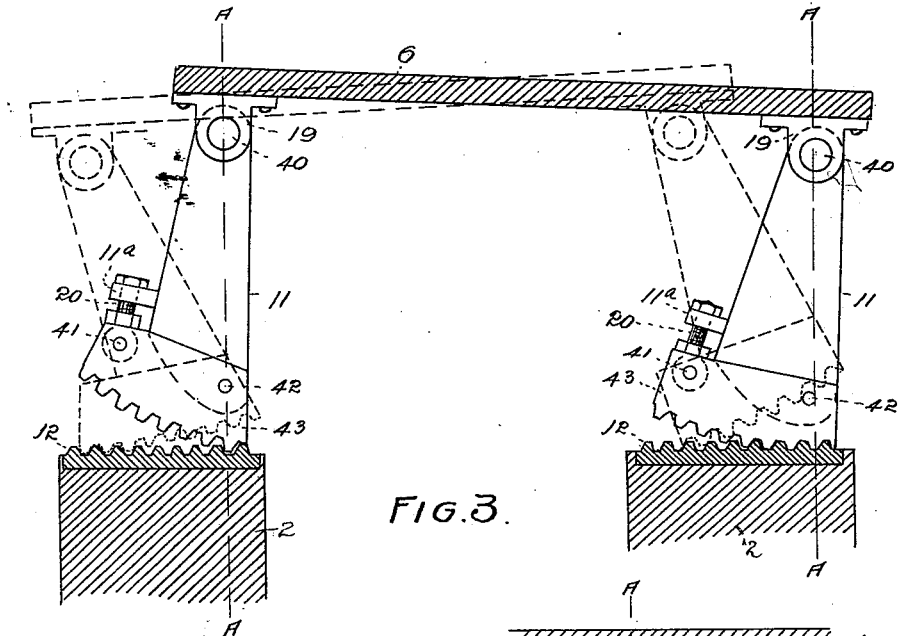
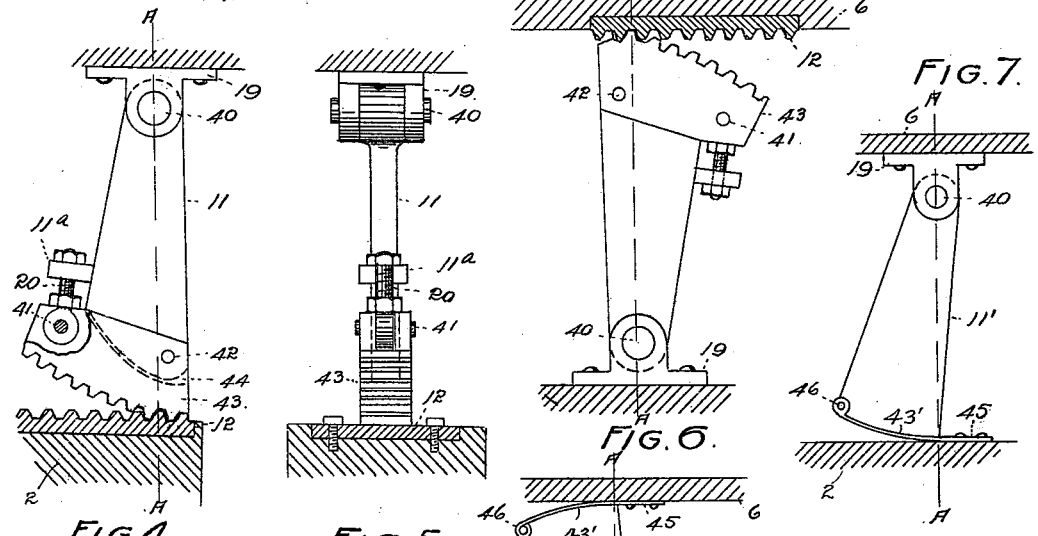

(No Model.) 3 Sheets—Sheet 3.
F. D. DARRAGH, C. W. BETTS & J. A. KILTON.
ORE CONCENTRATOR.
No. 544,290. Patented Aug. 13, 1895.
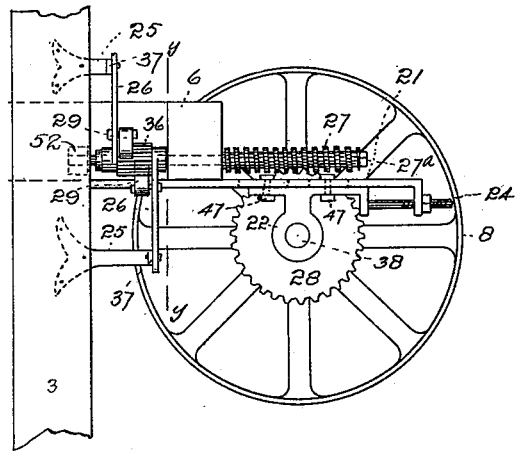
FIG. 9.
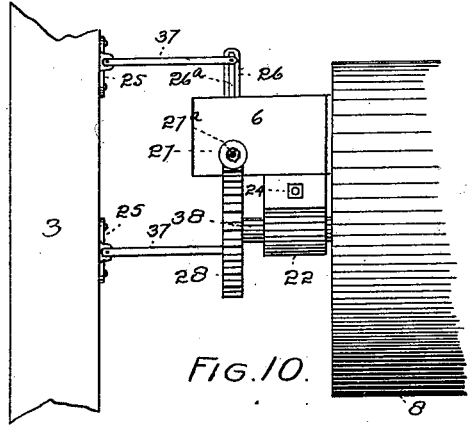
FIG. 10.
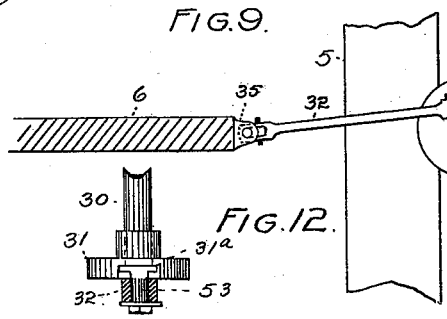
FIG. 12.
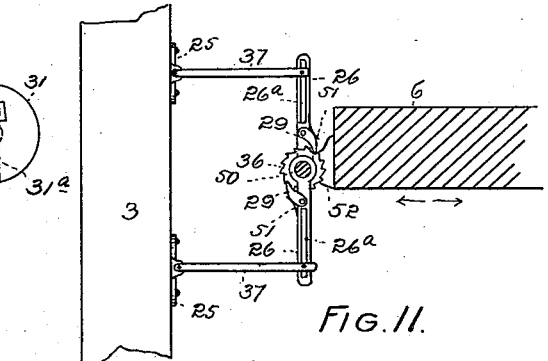
FIG. 11.
FIG. 13.
FIG. 14.
FIG. 15.
FIG. 17.
FIG. 16.
FIG. 18.
FIG. 19.
WITNESSES:
INVENTORS:
F. D. Darragh,
Charles W. Betts,
James A. Kilton,
by Collamer & Co., ATTORNEYS.

UNITED STATES PATENT OFFICE.

FREDERICK D. DARRAGH, CHARLES W. BETTS, AND JAMES A. KILTON, OF DENVER, COLORADO, ASSIGNORS TO THE COLORADO ORE CONCENTRATOR COMPANY, OF COLORADO.

ORE-CONCENTRATOR.

SPECIFICATION forming part of Letters Patent No. 544,290, dated August 13, 1895.

Application filed April 12, 1895. Serial No. 545,497. (No model.)

*To all whom it may concern:*

Be it known that we, FREDERICK D. DARRAGH, a subject of the Queen of Great Britain, and CHARLES W. BETTS and JAMES A. KILTON, citizens of the United States, residing at Denver, in the county of Arapahoe and State of Colorado, have invented certain new and useful Improvements in Ore-Concentrators; and we do hereby declare the following to be a full, clear, and exact description of the invention, such as will enable others skilled in the art to which it appertains to make and use the same.

This invention relates to the treatment of ore, and more especially to machines known as "concentrators" for separating the precious metals from the ore, and the object of the same is to produce improvements in machines of this character.

To this end the invention consists in the machine hereinafter more fully described and claimed, and as illustrated in the accompanying drawings, wherein—

Figure 1:
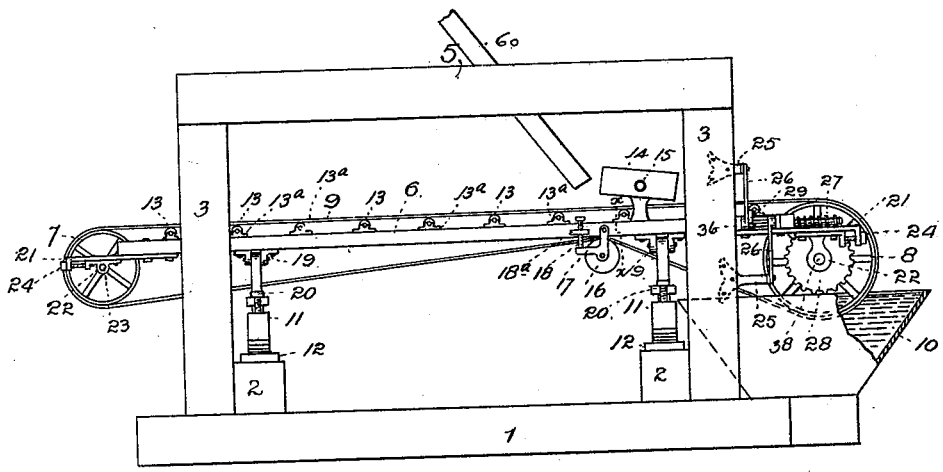
Figure 2:
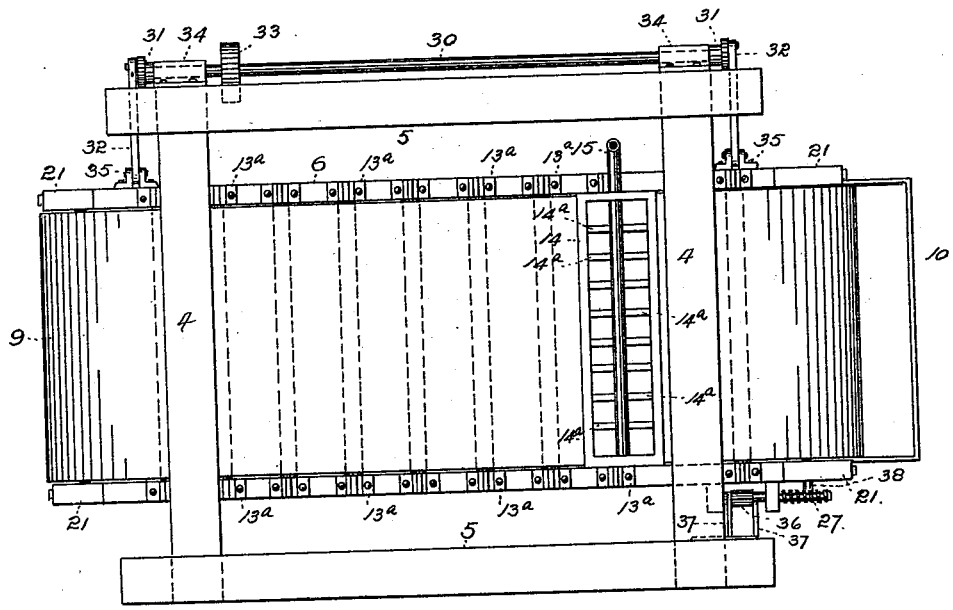

Figure 1 is a side elevation of this machine complete. Fig. 2 is a plan view thereof. Fig. 3 is an enlarged cross-section through the table, showing one pair of rockers thereunder. Fig. 4 is a side elevation of one rocker, partly broken away to show the means for adjusting its foot. Fig. 5 is an edge view of the rocker shown in Fig. 4. Fig. 6 is a slight modification of this rocker wherein the same is inverted. Figs. 7 and 8 show a modified form of rocker omitting the teeth and substituting a strap or spring. Fig. 9 is an enlarged side elevation of the driving mechanism. Fig. 10 is an end view of the same. Fig. 11 is a sectional view on line Y Y of Fig. 9. Fig. 12 is a sectional detail through the table, and shows in elevation the adjustable crank-pin for reciprocating said table. Fig. 13 is a plan view of the crank-wheel. Fig. 14 is an enlarged longitudinal section through the driving-shaft and worm, showing the means for locking the latter to the shaft when desired. Fig. 15 is an enlarged cross-section through the table on line X X of Fig. 1, showing the rollers for supporting the upper and lower sides of the belt. Fig. 16 is an enlarged side elevation of the belt-tightener. Fig. 17 is an enlarged plan view of a portion of the water-box. Fig. 18 is a front elevation of said box, showing the gates opening therefrom; and Fig. 19 is a cross-section on the line Z Z of Fig. 18.

Referring to the said drawings, the numeral 1 designates the base or floor, upon which is supported transverse sills 2, and from which also rises uprights 3 connected by cross-beams 4, the latter being in turn connected by side beams 5, the whole constituting the framework which supports this improved machine.

6 is the table, carrying at one end a wheel or drum 7 and at the other end a driving wheel or drum 8, and 9 is the endless belt or apron moving over these two drums and passing completely around the table and around both drums, being submerged in the water in tank 10, where it passes around the lower side of the driving-drum.

The shaft 23 of the drum 7 is mounted in sliding bearings 22, which are connected by screws 24 with supporting-brackets 21, bolted beneath the table, all as best seen in Fig. 1, whereby this drum can be adjusted when desired. We preferably, also, make use of a belt-tightener, Fig. 16, which consists of a roller or drum 16, whose trunnions are mounted in an L-shaped bracket 17, one arm of which is pivoted at 56 to the edge of the table and the other arm of which is controlled by a screw 18, taking through a nut $18^a$. When these screws are adjusted by hand or by a wrench, it will be obvious that the L-shaped brackets 17 will move on their pivots 56 and the axis of the drum or roller 16 will be properly adjusted, so as to regulate the tension which the belt 9 shall have. However, we reserve the right to employ any other suitable belt-tightener at this or any other desirable point or to omit the same entirely, if preferred. The upper side of the belt or apron 9 is supported by rollers 13, mounted in bearings $13^a$ near the edges of the table 6, as best seen in Fig. 15.

The water-distributer box by which clear water is distributed over the table at a point beyond the ore-distributer 60 embraces certain improvements and is best seen in Figs. 17, 18, and 19. This box 14 has transverse partitions $14^a$ dividing it into compartments of suitable size, the partitions rising from the bottom about half the height of the box, and 15 is the feed-pipe which passes through the box longitudinally and has perforations 15ª in its lower side.

14ᵇ are holes in the side of the box near its bottom, which are wholly or partially closed by pivoted gates 14ᶜ, whereby the flow of water from the compartments may be regulated as desired. The water enters through the feed-pipe 15 and escapes through the perforations 15ª into the several compartments, from which it flows out the openings 14ᵇ onto the belt or apron. As the latter is given a transverse reciprocation by means hereinafter described, the water in each compartment may slush or flow from one side thereof to the other, but it must always remain between any two of the partitions 14ª, whereas if constructed without these partitions the water would slush or flow throughout the entire length of the box during the transverse movements of the table, with the result that its discharge upon the apron was uneven—an objection which is avoided by our present construction.

The means for supporting the table 6 are best shown on Sheet 2 of the drawings and in Figs. 3 to 8, inclusive, and they consist of legs or (more properly speaking) rockers pivoted at their upper ends beneath the table and rocking at their lower ends upon the sills or pivoted at their lower ends and rocking at their upper ends, the point of rocking being either toothed or plain; but the idea is that a vertical line A A may be always drawn through the pivotal point and the supporting-point on the rocker in contradistinction to other devices heretofore patented, wherein the supports were pivoted at both ends or stood constantly at an angle with each other, or wherein the table always maintained a horizontal position.

Referring to the drawings, the numerals 19 designate ears or brackets, within which are pivoted stub-shafts 40 at one end of each leg or rocker 11, and 43 is a toothed segment pivoted at 42 to the other end of the rocker and fitting thereover, as seen at 44. 20 is an eye-bolt pivoted at 41 to the projecting end of this segment and engaging an ear 11ª on the rocker, whereby the angle of the segment to the axis of the rocker may be adjusted at will. When the face of the segment is toothed, the opposing face of the sill 2 or table 6 is provided with a flat toothed plate 12.

The modification shown in Figs. 7 and 8 consists in dispensing with the segment and in providing the rocker 11' with a strap connection at its foot, which, preferably, consists of a spring 43', secured at one end 45 to the adjacent member 6 or 2, passing loosely over the rounded end or foot of the rocker, and pivoted at its other extremity 46 to the farther corner of the rocker. It is obvious that in this modification the above-described adjustment cannot be effected, but as it is quite simple we use it in some cases. However, the engaging teeth produce a jar or tremor, while the construction described in the modification does not, and when this tremor is desirable the teeth should be used.

Power is applied to a pulley 33 upon a longitudinal driving-shaft 30, and at each end of the latter is a crank-wheel 31, having a diametric groove 31ª, T-shaped in cross-section, as seen in Fig. 13. 53 is a bolt whose head fits this groove and may be adjusted therein so as to vary the length of throw, and 32 is a pitman-rod pivoted at one end on the bolt and pivotally connected at its other end with a bracket 35, secured to the edge of the table 6. By this means it will be seen that the lateral motion of the table can be adjusted from a considerable throw to hardly any perceptible movement, the degree only varying with the diameter of the crank-wheel 31.

The means for feeding the apron 9 are best seen in Figs. 9, 10, and 11.

25 are brackets secured to one of the uprights 3, and 37 are links pivoted at one end therein, the opposite ends of these links being adjustably pivoted in slots 26ª of levers 26, carrying pawls 29, actuated by springs 51. The inner ends of these levers have eyes, which are journaled on a shaft 50 at opposite sides of a ratchet-wheel 36, which said spring-actuated pawls 29 engage; and the shaft 50 is mounted in suitable journals 52, supported by the table, and projects beyond the end thereof. In Fig. 14 it will be seen that this shaft carries two cones 54 and 55, which enter cavities in the ends of a long worm or spiral 27 that surrounds the shaft; and 55ª is a friction-nut by means of which the cone 55 can be pressed tightly into one end of the worm when it is desired to lock the latter firmly to the shaft and cause it to rotate therewith. When this movement is not desired, the nut 55ª is loosened. By this construction it will be seen from Fig. 11 that as the table reciprocates in the direction of the arrows the levers 26 and pawls 29 will alternately cause the rotation of the ratchet 36 and shaft 50, the degree of movement thereof being regulated by the points of connection between the links 37 and the levers.

The shaft 38 of the driving-drum 8 may be mounted in bearings 22, adjusted by screws 24, the same as the shaft of the drum 7, as above described, all as seen in Fig. 9; but this shaft 38 carries a worm-gear 28 at its extremity, which meshes with the threads of the spiral or worm 27, and hence when the latter is clamped by the nut 55ª to the shaft 50 the reciprocation of the table and step-by-step rotation of the worm will cause a similar rotation of the drum 8 and will move the belt or apron 9 in the proper direction at the desired speed.

All parts of this machine are of the desired sizes, shapes, proportions, and materials, and considerable change in the specific details of construction may be made without departing from the principle of our invention.

In operation power is applied to the pulley 33, whereby a lateral reciprocation is given to the table 6, and this movement of the latter causes the step-by-step rotation of the drum 8, which in turn causes the apron 9 to progress in the direction of the arrow of Fig. 1. Water is fed through the pipe 15 to the box 14, and flows under suitable regulation through the openings 14$^b$ onto the apron near the upper end of the latter, and then flows downhill on the apron toward the left of Fig. 1, and finally off the same over the drum 7. The powdered ore is fed at 60 onto the apron in the usual manner, and the various movements of the table which carries the apron thoroughly agitate and evenly spread the ore thereon. From a point beneath the hopper 60 the pulp passes next under the clear water flowing out of the box 14 and is washed thereby, and the precious metals in the pulp cling to the moving belt and are conveyed over the drum 8 into the trough or receptacle 10, while the water and dross flows in the opposite direction. The degree of side shake given the table may be regulated by adjusting the bolt 53 in the groove 31$^a$. The adjustment of this side shake will automatically regulate the rotation of shaft 50, and will therefore regulate the step-by-step revolution of the drum 8 and movement of the apron 9; but if further regulation of this movement is desired the pivotal points between the links 37 and levers 26 may be adjusted. All upward movement of the belt may be checked by loosening the nut 55$^a$. The flow of water may be regulated by the gates 14$^c$. The belt may be tightened by adjusting the screws 24 or 18, or both. A jar or tremor is given to the apron by employing the toothed segments shown on Sheet 2, or is avoided by employing the rockers shown in Figs. 6 and 7, and finally the arcs of movement through which the opposite edges of the table shall pass during its lateral reciprocation may be adjusted by means of the screws 20.

In Fig. 3 we have shown a pair of rockers with the adjusting-screws on correspondingly-similar sides. This is a construction which may be desirable, although it is probable we shall locate the screws on the outer sides of the rockers or legs, in order that they may be more readily accessible from outside the framework of the machine.

Having thus described our invention, what we claim as new, and desire to secure by Letters Patent, is—

1. In an ore concentrator, the combination with two drums, a gear on the shaft of one of them, and a belt moving around said drums; of a worm engaging said gear and having conical cavities in its ends, a shaft extending loosely through the worm, a pair of cones on the shaft adapted to enter said cavities, and means substantially as described for approximating the cones, as and for the purpose set forth.

2. In an ore concentrator, the combination with a table, drums supported thereby and one of them having a gear on its shaft, and an endless belt moving around the drums; of a worm engaging said gear and having conical cavities in its ends, a shaft extending loosely through the worm and threaded near one end thereof, a cone fixed on the shaft and entering one cavity, a second cone loose on the shaft entering the other cavity, a friction nut on the threads adjacent the loose cone, and means for turning the shaft, substantially as described.

3. In an ore concentrator, the combination with a laterally reciprocating table, drums journaled across its ends and one of them having a worm gear on its shaft, and an endless apron moving around the drums and table; of a worm engaging said gear and loosely mounted on a shaft, connections substantially as described for turning the shaft with a step by step movement from the reciprocating motion of the table, the extremities of the worm having conical cavities, cones mounted on the shaft and seated in said cavities, and a friction nut on the shaft adjacent one cone, as and for the purpose set forth.

4. In an ore concentrator, the combination with a laterally reciprocating table, drums journaled across its ends and one of them having a worm gear on its shaft, and an endless apron moving around the drums and table; of a worm engaging said gear and mounted on a shaft, bearings on the table in which said shaft is journaled, a ratchet fast on the shaft, a lever journaled on the shaft and having a spring-actuated pawl engaging said ratchet, the outer end of the lever being slotted, and a link pivotally connected at one extremity to some stationary part of the framework and adjustably pivoted at its other extremity in said slot of the lever, as and for the purpose set forth.

5. In an ore concentrator, the combination with a laterally reciprocating table, drums journaled across the ends and one of them having a worm gear on its shaft, and an endless apron moving around the drums and table; of a worm engaging said gear and loosely mounted on a shaft, the extremities of the worm having conical cavities, cones mounted on the shaft and seated in said cavities, a friction nut on the shaft adjacent one cone, bearings on the table in which said shaft is journaled, a ratchet fast on the shaft, a pair of levers pivoted at their inner ends on said shaft, and having spring-actuated pawls engaging the ratchet, and a pair of links pivotally connected at their outer extremities with some stationary part of the framework and adjustably connected at their inner extremities with the outer ends of the levers, as and for the purpose set forth.

6. In an ore concentrator, the combination with a table, mechanism for reciprocating the same laterally, means for adjusting the degree of reciprocation, drums journaled across the ends of the table, and an endless apron moving around the table and drums; of a shaft journaled in bearings on the table, means for turning the shaft automatically by the movement of the table, and a worm and gear connecting said shaft with one of the drums, as and for the purpose set forth.

7. In an ore concentrator, the combination with a table, mechanism for reciprocating the same laterally, means for adjusting the degree of reciprocation, drums journaled across the ends of the table, and an endless apron moving around the table and drums; of a shaft journaled in bearings on the table, connections between said shaft and one drum for communicating the rotation of the shaft to the drum, levers journaled on the shaft, pawl and ratchet connections between the levers and shaft, and links connected at one extremity with some stationary part of the framework and adjustably connected at their other extremities with said levers, as and for the purpose set forth.

8. In an ore concentrator, the combination with a main framework having sills, a table, and an apron moving longitudinally over the table; of legs between the edges of the table and the subjacent sills, each leg being pivoted at one extremity to one member, a rocker segment connected to the other extremity of the leg with its rounding face contacting with the other member, and means for adjusting the angle of this segment to its leg, as and for the purpose set forth.

9. In an ore concentrator, the combination with a main framework having sills, a table, and an apron moving longitudinally over the table; of legs between the edges of the table and the subjacent sills, each leg being pivoted at one extremity to one member, a rocker segment pivotally connected to the other extremity of the leg with its rounding face provided with teeth, a flat toothed plate on the other member with which said teeth engage, and means for adjusting the angle of this segment to its leg, as and for the purpose set forth.

10. In an ore concentrator, the combination with a main framework having sills, a table, and an apron moving longitudinally over the table; of legs between the edges of the table and the subjacent sills, each leg being pivoted at one extremity to one member, a rocker segment pivotally connected to the other extremity of the leg with its rounding face provided with teeth, a flat toothed plate on the other member with which said teeth engage, an eye-bolt pivoted to said segment remote from its pivot to the leg, and an ear on the leg with which said bolt is adjustably connected, as and for the purpose set forth.

11. In an ore concentrator, the combination with a main framework having sills, a table, and an apron moving longitudinally over the table; of legs between the edges of the table and the subjacent sills, each leg being pivoted at one extremity to one member, a rocker segment pivotally connected to the other extremity of the leg with its rounding face contacting with the other member, an eye-bolt pivoted to said segment remote from its pivot to the leg, and an ear on the leg with which said bolt is adjustably connected, as and for the purpose set forth.

12. In an ore concentrator, the combination with a main framework having sills, a table, and an apron moving longitudinally over the table; of legs between the edges of the table and the subjacent sills, each leg being pivoted at its upper end in a bracket secured to the table, a flat toothed plate carried by the subjacent sill, a segment having a recess embracing the lower end of the leg, a pivot between these parts, the segment having a toothed rocker-face engaging the teeth on said plate, an eye-bolt pivoted to the remote end of the segment, and an ear on the leg with which said bolt is adjustably connected, as and for the purpose set forth.

In testimony whereof we affix our signatures in the presence of two witnesses.

FRED. D. DARRAGH.
CHARLES W. BETTS.
JAMES A. KILTON.

In presence of—
A. W. GILLETTE,
JOSEPH LEIF.